US012700231B2

(12) United States Patent
Weimer et al.

(10) Patent No.: US 12,700,231 B2
(45) Date of Patent: *Aug. 4, 2026

(54) METHOD AND DEVICE FOR CLASSIFYING PLANTS, AND COMPUTER PROGRAM PRODUCT

(71) Applicant: Robert Bosch GmbH, Stuttgart (DE)

(72) Inventors: Andreas Weimer, Gaertringen (DE); Farid Khani, Boennigheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 449 days.

This patent is subject to a terminal disclaimer.

(21) Appl. No.: 18/246,824

(22) PCT Filed: Sep. 22, 2021

(86) PCT No.: PCT/EP2021/076023
§ 371 (c)(1),
(2) Date: Mar. 27, 2023

(87) PCT Pub. No.: WO2022/111881
PCT Pub. Date: Jun. 2, 2022

(65) Prior Publication Data
US 2023/0394815 A1      Dec. 7, 2023

(30) Foreign Application Priority Data
Nov. 26, 2020    (DE) ..................... 10 2020 214 838.4

(51) Int. Cl.
*G06V 20/10*          (2022.01)

(52) U.S. Cl.
CPC .................................. *G06V 20/188* (2022.01)

(58) Field of Classification Search
CPC ....... G06V 20/188; G06V 20/56; G06V 20/68
See application file for complete search history.

(56) References Cited

U.S. PATENT DOCUMENTS

2020/0410234 A1* 12/2020 Halligan .............. G06V 10/764
2021/0386051 A1* 12/2021 Seitz ................... A01M 21/043
(Continued)

FOREIGN PATENT DOCUMENTS

DE          4413739 C2      7/1996
DE   102017210804 A1     12/2018
DE   102018217742 A1      4/2020
(Continued)

OTHER PUBLICATIONS

International Search Report for PCT/EP2021/076023, Issued Jan. 7, 2022.

*Primary Examiner* — Delomia L Gilliard
(74) *Attorney, Agent, or Firm* — NORTON ROSE FULBRIGHT US LLP

(57) ABSTRACT
A method for classifying plants. In the method, the plants or their plant components are detected within an evaluation region at a first evaluation point in time with the aid of an optical and/or infrared detection unit, and the detected image data of the detection unit are evaluated with the aid of an algorithm. Using the evaluation, it is possible to distinguish at least one first plant type from at least one second plant type. The second plant type being treated in particular with a medium, preferably a liquid spray.

11 Claims, 5 Drawing Sheets

(56)                  References Cited

U.S. PATENT DOCUMENTS

2023/0380404 A1\* 11/2023 Weimer ............... A01B 79/005
2024/0412323 A1\* 12/2024 Peake .................. A01B 63/002

FOREIGN PATENT DOCUMENTS

DE       102018221248 A1      6/2020
DE       102018222428 A1      6/2020
DE       102019211642 A1      2/2021
EP            3192342 B1     10/2019

\* cited by examiner

METHOD AND DEVICE FOR CLASSIFYING PLANTS, AND COMPUTER PROGRAM PRODUCT

FIELD

The present invention relates to a method and a device for classifying plants, as used in particular for agricultural applications, to allow crops to be distinguished from weeds, thus allowing the plants to be treated in a targeted manner as a function of the plant type. Moreover, the present invention relates to a computer program product as an integral part of such a device or for carrying out the method according to the present invention.

BACKGROUND INFORMATION

A method for classifying plants is described in German Patent Application No. DE 10 2017 210 804 A1. In the conventional method, an area of a useable surface is detected with the aid of an optical and/or infrared detection unit, and the detected image data are evaluated. The objective is to recognize crops that are arranged in the form of plant rows, in order to allow the crops to be distinguished from plants that are situated between the crops or plant rows, which are classified in particular as weeds, to allow them to be treated with the aid of appropriate sprays, for example.

SUMMARY

A method according to the present invention for classifying plants may have the advantage that it may distinguish in a particularly certain and reliable manner a first plant type, which is used in particular as a crop and which is an integral part of a plant row, from a second plant type, which is typically in the form of a weed or the like, and which is to be treated with the aid of a spray. In particular, the method according to the present invention allows border areas of the evaluation window, generated with the aid of the detection unit, to be evaluated in a particularly reliable manner with regard to the plant type that is actually present. Thus, the method according to the present invention allows plants or plant components that are detected in the border area of the evaluation window to be assigned to the first plant type (or plant row), which otherwise, due to their lack of connection to or association with the plant row, would be assigned to the second plant type. The method according to the present invention thus allows in particular the situation to be avoided that plants are treated, for example, with an herbicide or the like because they have erroneously been detected as weeds.

The above-stated advantages of the method according to the present invention may be achieved in that plants or their plant components are assigned to the first plant type at the first evaluation point in time when, within the evaluation region, they are not associated with a plant row that is formed by the first plant type, and in addition protrude into the evaluation region from an upper boundary or a lower boundary of the evaluation region up to a maximum first distance, in particular extending in a movement direction or opposite a movement direction of the detection unit.

Advantageous refinements of the method according to the present invention for classifying plants are disclosed herein.

A particularly simple or reliable assignment of plants or plant components to the first plant type may be achieved when plants or plant components are recognized as belonging to a plant row when the plants or plant components extend continuously, without interruption, from the upper boundary to the oppositely situated lower boundary of the evaluation region.

According to an example embodiment of the present invention, for further simplification or assignment of the recognized plants or plant components to the first or the second plant type, it may also be provided that the plants or plant components, which are not associated with the plant row and which at the first evaluation point in time are assigned to the first plant type, are additionally situated within a second distance from the plant row. In other words, this means that plants or plant components that are situated at a certain minimum distance from the plant row are regarded as not belonging to this plant row, and that a protrusion of the plant of this plant row from an area situated outside the evaluation window at that moment is regarded as unlikely.

In addition, it is important that a possibly necessary treatment of the second plant type, for example with a spray that is selectively sprayed with the aid of a spray nozzle at a spray rack, may be carried out at the right time so that the affected plants or plant components are reliably detected. Against this background, a further preferred embodiment of the method provides that the plants or plant components initially assigned to the first plant type and not associated with the plant row are assigned to the second plant type when, at a second evaluation point in time after the first evaluation point in time, the distance of the plants or plant components from the upper boundary or the lower boundary of the evaluation region is greater than the first distance. In this way, in particular the necessary response time or activation time for a spray nozzle, for example, is enabled in order to allow such plants or plant components to still be treated with the spray.

Furthermore, it may be provided that the plants or plant components initially assigned to the first plant type and not associated with the plant row are assigned to the second plant type when, at a second evaluation point in time after the first evaluation point in time, a plant-free space is formed between the plants or plant components and the upper boundary or the lower boundary of the evaluation region. In this case it may be reliably ruled out that the plants or plant components that are initially detected and preliminarily assigned to the first plant type are associated with the plant row.

In particular, according to an example embodiment of the present invention, it may be provided that the detection unit is moved in the direction of the upper boundary or the lower boundary of the evaluation region during the detection of the plants or plant components. In the process, a continuous movement of the detection unit situated at an agricultural vehicle typically takes place, and the images recorded by the detection unit are detected or generated with a certain frequency, for example.

In this regard, it is particularly advantageous when image data from evaluation regions that are evaluated in succession partially overlap one another in the direction of the upper boundary or the lower boundary of the evaluation region. In this way a continuous data flow, and in particular a particularly certain and reliable recognition of the (first) plant type that is associated with the plant row, are made possible.

Moreover, the present invention also encompasses a device, in particular as an integral part of an agricultural vehicle, including an optical and/or infrared detection unit and a control device including an algorithm that is designed to carry out the method(s) according to the present invention.

In one refinement of such a device according to the present invention, it may be provided that a spray unit including at least one selectively activatable spray nozzle for treating plants or plant components of the second plant type is additionally provided.

The present invention also encompasses a computer program product, in particular in the form of a data program or a data medium, that is designed to carry out at least one method step according to the present invention or that is used as an integral part of the device according to the present invention.

Further advantages, features, and particulars of the present invention result from the following description of preferred specific embodiments of the present invention, and with reference to the figures.

DETAILED DESCRIPTION OF EXAMPLE EMBODIMENTS

Figure 1:
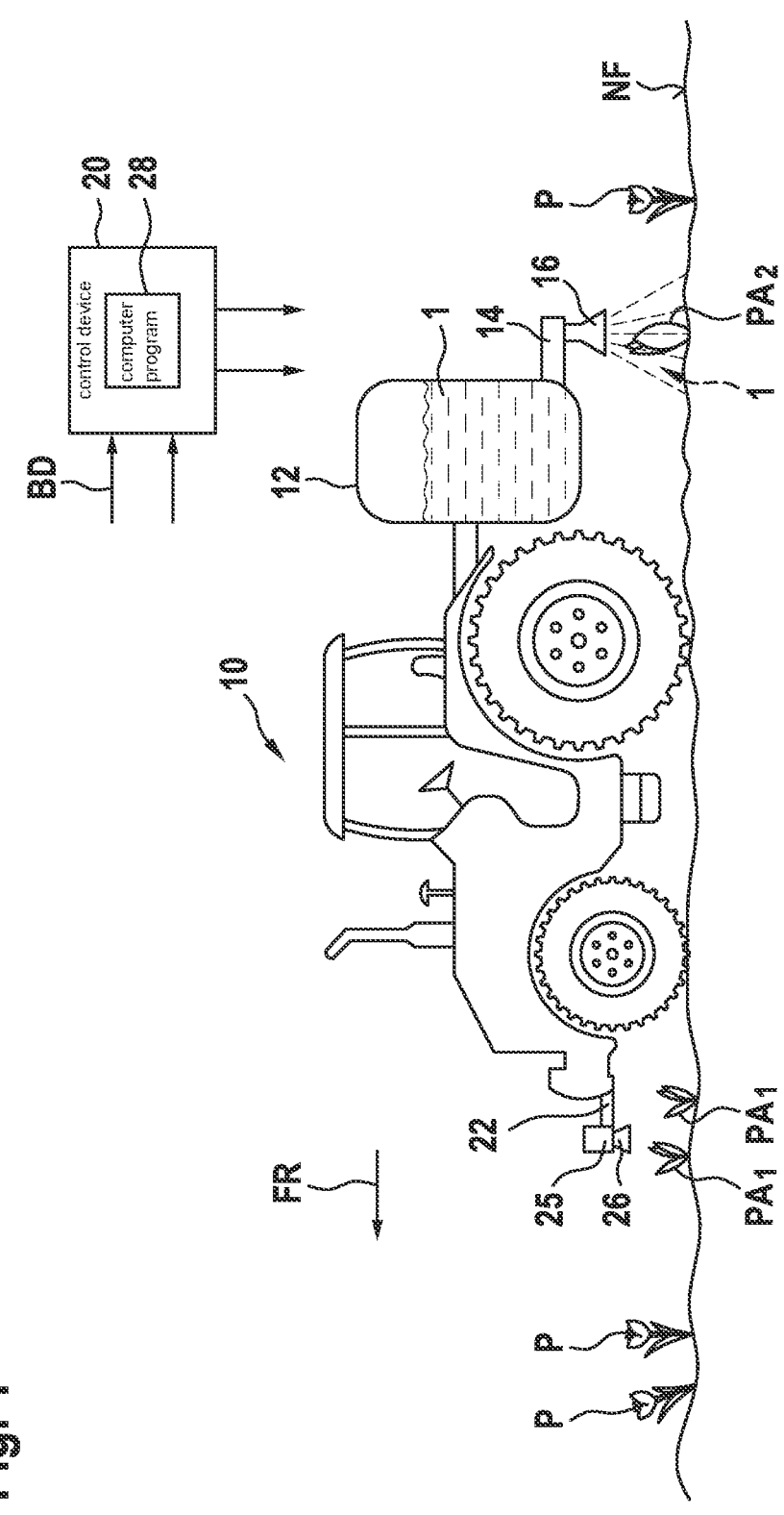
FIG. 1 shows a simplified side view of an agricultural vehicle during travel over a useable agricultural surface covered with plants, according to an example embodiment of the present invention.

Similar elements or elements having the identical function are provided with the same reference numerals in the figures.

FIG. 1 illustrates an agricultural vehicle 10 in the form of a tractor or the like which travels along a useable surface NF in a travel direction FR. Plants P that may be differentiated into at least two plant types $PA_1$ and $PA_2$ are situated on useable surface NF. First plant type $PA_1$ preferably involves crops that have been sown on useable surface NF in the form of parallel plant rows PR, or that grow there. In contrast, second plant type $PA_2$ in particular involves weeds that are to be treated with the aid of a spray 1. For treating second plant type $PA_2$, agricultural vehicle 10 includes a supply tank 12 in the rear area that is used for storing spray 1. Also situated at the rear area of vehicle 10 is a spray unit that includes a spray rack 14 that extends transversely with respect to travel direction FR of vehicle 10, i.e. perpendicularly to the plane of the drawing in FIG. 1. In the longitudinal direction of spray rack 14, the spray rack includes spray nozzles 16, as is conventional, that are spaced apart at uniform horizontal distances, for example, and that may be selectively activated by a vehicle-internal control device 20 to allow plants P of second plant type $PA_2$, situated in the spray area of particular spray nozzle 16, to be sprayed with spray 1. For this purpose, spray nozzles 16 are also connected, in a conventional manner, to supply tank 12 via valve devices and liquid lines (not illustrated).

For detecting plants P or for distinguishing between the two different plant types $PA_1$ and $PA_2$, by way of example a detection unit 25 that is fastened to a boom 22 is also provided at the front area of agricultural vehicle 10.

Detection unit 25 includes by way of example multiple identical or similar optical and/or infrared recording units 26, which are likewise spaced apart at uniform horizontal distances, perpendicularly with respect to the plane of the drawing in FIG. 1, and which by way of example may in each case detect a certain partial area of useable surface NF traveled over by agricultural vehicle 10 in the region of the area that is treatable by spray nozzles 16. Recording units 26 in each case generate, for example at uniform time intervals (optionally as a function of speed), image data BD which are supplied to control device 20 as an input variable. Control device 20, which is typically supplied with additional data as an input variable, includes, among other things, an algorithm 28, in particular in the form of a computer program product, that is designed to analyze image data BD with regard to the occurrence of the two plant types $PA_1$ and $PA_2$.

Figure 2:
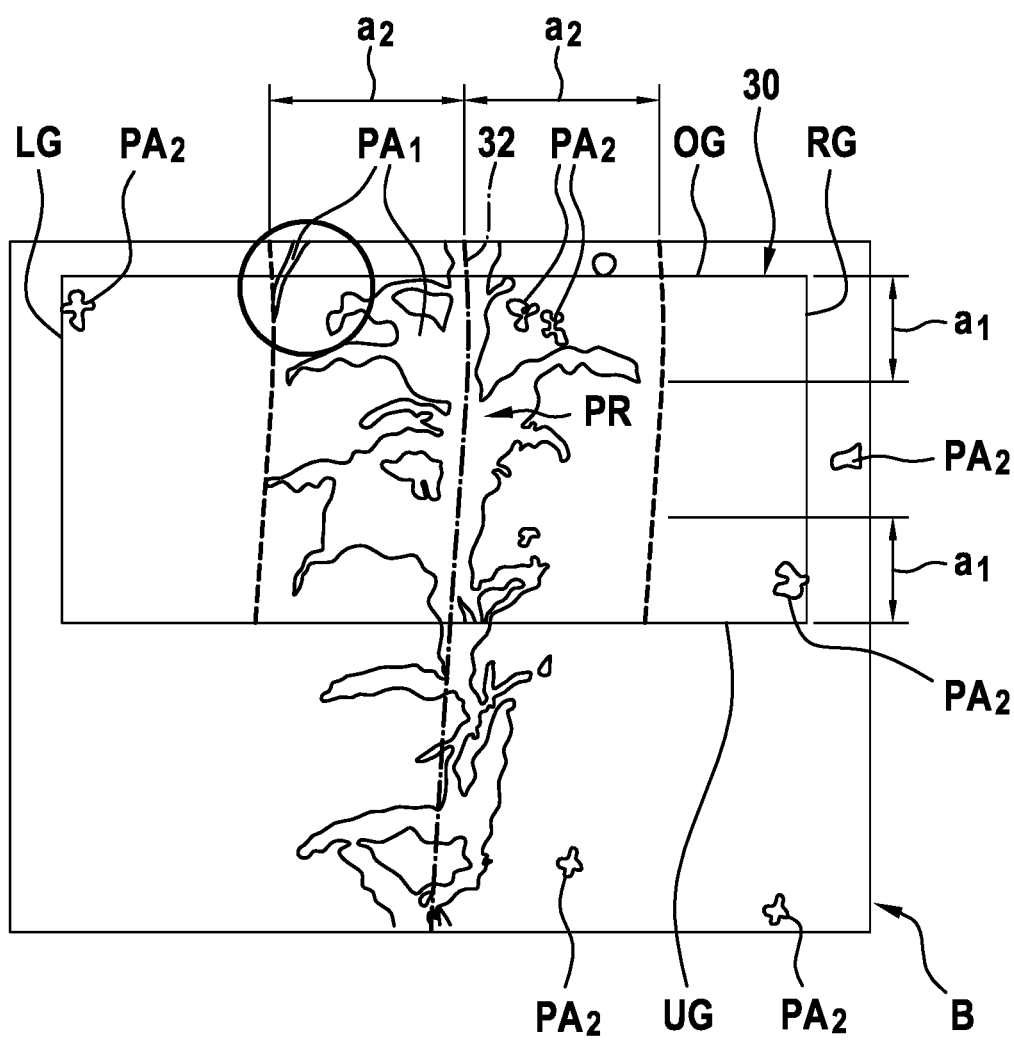
FIG. 2 shows an image recording by a detection unit while traveling over the useable surface according to FIG. 1.
Figure 3:
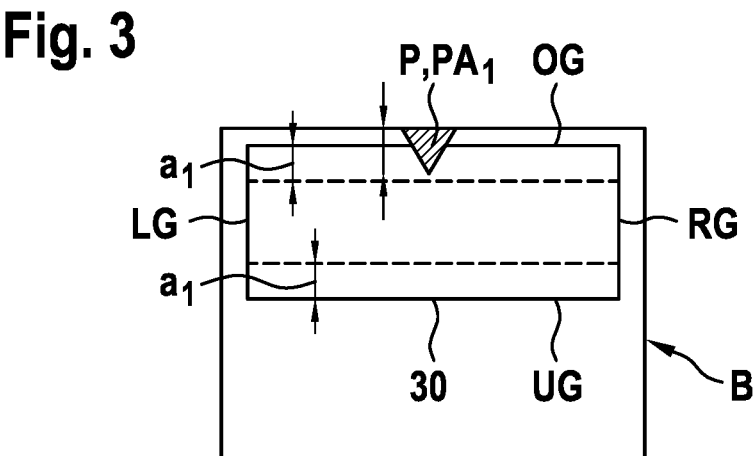
FIGS. 3 through 10 each show simplified illustrations of areas, recorded at different points in time, of the useable surface traveled over by the vehicle, corresponding to FIG. 2.

As explained above, plants P of first plant type $PA_1$ are characterized in that they are situated in the form of plant rows PR on useable surface NF or grow thereon. FIG. 2 illustrates how plant row PR has been detected within a recorded image B of recording unit 26 during travel over useable surface NF. Plant row PR is recognized as such, in that within an evaluation region 30 of image B, which as an example has a rectangular design in the top view and includes a lower boundary UG, an upper boundary OG, a right boundary RG, and a left boundary LG, plants P of first plant type $PA_1$ are all associated with one another; i.e., there is at least one continuous association between plants P.

Also apparent within evaluation region 30 are solitary plants P that are not associated with plant row PR. These plants are basically classified as belonging to second plant type $PA_2$. A plant P1 protrudes into evaluation window 30, near plant row PR, in the area of upper boundary OG of evaluation window 30, and according to the method according to the present invention is initially classified as belonging to first plant type $PA_1$, although in image B in FIG. 2 it is not associated with plant row PR. For classification into first plant type $PA_1$, it is also necessary for this plant P1 to be detected within a maximum first upper (or lower) distance $a_1$ from upper boundary OG or lower boundary UG of evaluation region 30. If a plant row PR has already been detected, as is the case in FIG. 2, it is also provided in particular that plant P1 must be situated within a maximum lateral distance $a_2$, characterized by plant row center line 32 of plant row PR.

For the sake of simplicity, plants P in evaluation region 30 that are detected with the aid of detection unit 25 are symbolically represented by triangles in subsequent FIGS. 3 through 10.

FIG. 3 illustrates once again a classification of a plant P into plant type $PA_1$, since plant P is situated within first distance $a_1$ from upper boundary OG of evaluation region 30, although no plant row PR has been detected.

Figure 4:
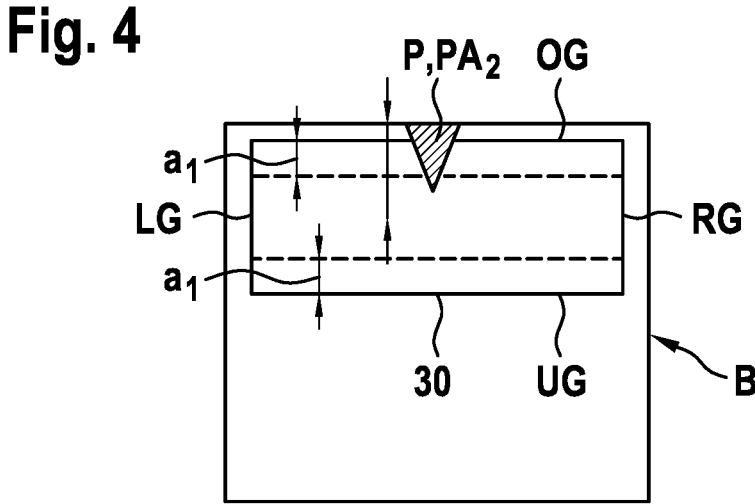
Figure 5:
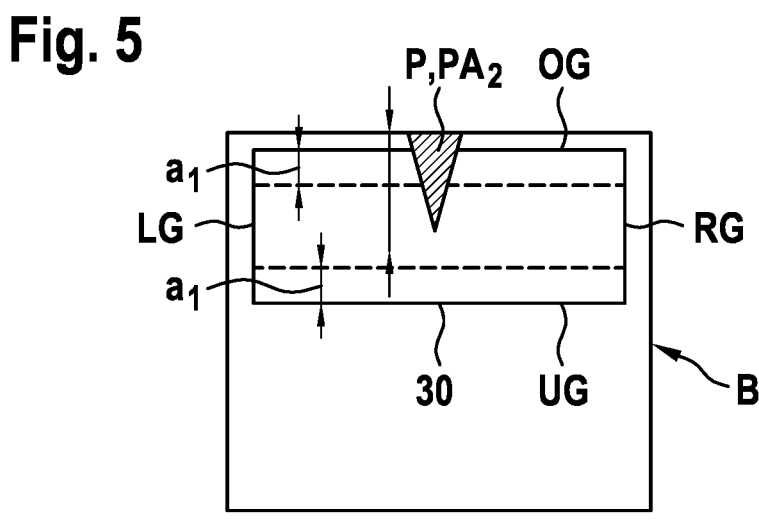

When agricultural vehicle 10 travels over useable surface NF, as explained above, detection unit 25 continuously generates image data BD or evaluation windows 26, which preferably overlap slightly in travel direction FR to allow a continuous detection of useable surface NF that is traveled over, and of plants P situated on useable surface NF. FIGS. 4 and 5 illustrate that in two successive recordings by detection unit 25 at two successive evaluation points in time, a plant P has exceeded distance $a_1$ from upper boundary OG of evaluation region 26. Therefore, this plant P is classified as belonging to second plant type $PA_2$.

Figure 6:
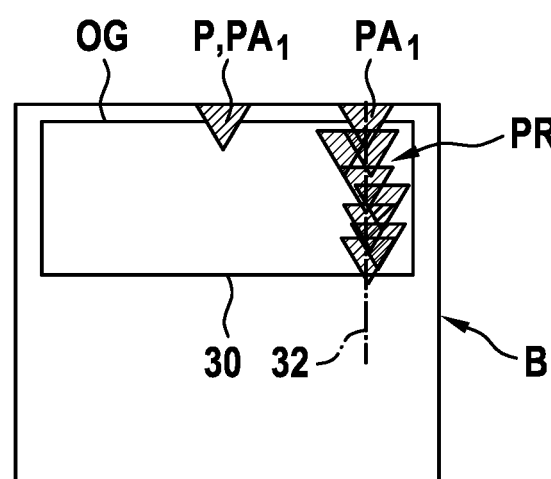
Figure 7:
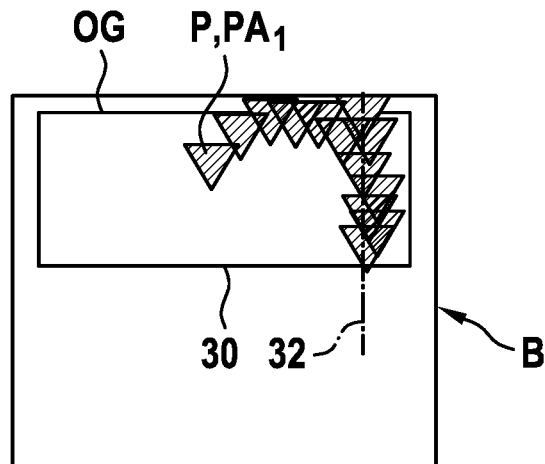

FIGS. 6 and 7 illustrate, in two successive images, how plant P that is situated in image B to the left of plant row PR has initially been classified as belonging to first plant type $PA_1$. Upon further travel over useable surface NF and detection at a second recording point in time, it is recognized that plant P, which protrudes from upper boundary OG into evaluation region 30 in FIG. 6, in the further course is associated with plant row PR, so that the classification into first plant type $PA_1$ has proven to be correct.

Figure 8:
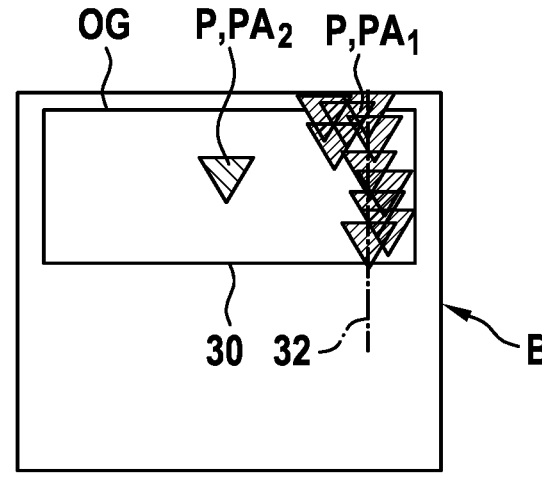

In contrast, FIG. 8 illustrates that plant P, likewise initially situated to the left of plant row PR and assigned to first plant type $PA_1$ corresponding to FIG. 7, in the further course (FIG. 8) has turned out be a separate plant P that is not associated with plant row PR. In this case a reclassification from first plant type $PA_1$ into plant type $PA_2$ takes place.

Figure 9:
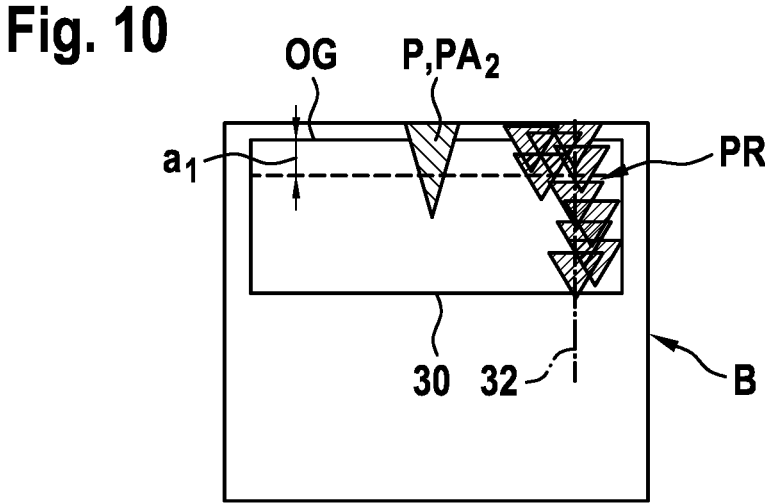
Figure 10:
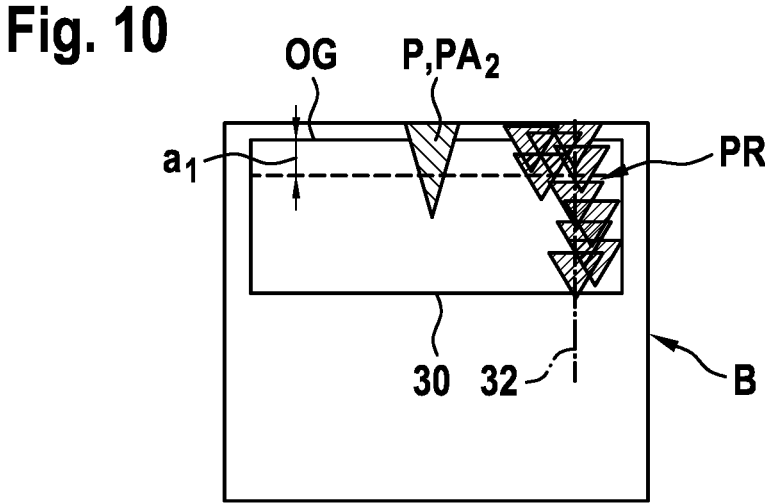

Lastly, it is illustrated in the figure sequence in FIGS. 9 and 10 that plant P, situated to the left of plant row PR, has initially been classified into first plant type $PA_1$, since the plant protrudes from upper boundary OG into evaluation region 30, and its distance from upper boundary OG is smaller than distance $a_1$. At a later recording point in time according to FIG. 10, it is illustrated that this plant P, although it still protrudes from upper boundary OG into evaluation region 30, in the meantime has exceeded critical distance $a_1$. In this case a reclassification from first plant type $PA_1$ into second plant type $PA_2$ takes place to still allow an activation of corresponding spray nozzle 16 at spray rack 14 at the right time, with the aid of control device 20. In this case, although it is not ruled out that this plant P in the further course is still associated with plant row PR or detected as an integral part of plant row PR, this is accepted in order to allow a treatment of plant P at the right time with the aid of spray 1.

The described method or the device may be altered or modified in various ways without departing from the concept according to the present invention.

What is claimed is:

1. A method for classifying plants, the method comprising the following steps:
   detecting the plants or plant components of the plants within an evaluation region at a first evaluation point in time using an optical and/or infrared detection unit that includes multiple optical and/or infrared recorders;
   evaluating detected image data of the infrared detection unit using an algorithm;
   distinguishing, using the evaluation, at least one first plant type from at least one second plant type;
   treating the second plant type with a medium;
   wherein certain of the plants or their plant components are assigned to the first plant type at the first evaluation point in time when, within the evaluation region, they are not associated with a plant row formed by the first plant type and protrude into the evaluation region from an upper boundary or a lower boundary of the evaluation region up to a maximum first distance.

2. The method as recited in claim 1, wherein the medium is a liquid spray.

3. The method as recited in claim 1, wherein certain of the plants or plant components are recognized as belonging to a plant row when they extend continuously, without interruption, from the upper boundary to the oppositely situated lower boundary of the evaluation region.

4. The method as recited in claim 1, wherein those of the plants or plant components, which are not associated with the plant row and which at the first evaluation point in time are assigned to the first plant type, are additionally situated within a second distance from the plant row.

5. The method as recited in claim 1, wherein those of the plants or plant components initially assigned to the first plant type and not associated with the plant row are assigned to the second plant type when, at a second evaluation point in time after the first evaluation point in time, the distance of the plants or plant components from the upper boundary or the lower boundary of the evaluation region is greater than the first distance.

6. The method as recited in claim 1, wherein those of the plants or plant components initially assigned to the first plant type and not associated with the plant row are assigned to the second plant type when, at a second evaluation point in time after the first evaluation point in time, a plant-free space is formed between the plants or plant components and the upper boundary or the lower boundary of the evaluation region.

7. The method as recited in claim 1, wherein the infrared detection unit is moved in a direction of the upper boundary or the lower boundary of the evaluation region during the detection of the plants or plant components.

8. The method as recited in claim 7, wherein image data from two evaluation regions that are evaluated in succession partially overlap one another in a direction of the upper boundary or the lower boundary of the evaluation region.

9. A device as an integral part of an agricultural vehicle, the device comprising:
   an optical and/or infrared detection unit that includes multiple optical and/or infrared recorders; and
   a control device configured to classify plants, the control device configured to:
      detect the plants or plant components of the plants within an evaluation region at a first evaluation point in time using the infrared detection unit,
      evaluate detected image data of the infrared detection unit using an algorithm;
      distinguish, using the evaluation, at least one first plant type from at least one second plant type,
      treat the second plant type with a medium,
      wherein certain of the plants or their plant components are assigned to the first plant type at the first evaluation point in time when, within the evaluation region, they are not associated with a plant row formed by the first plant type and protrude into the evaluation region from an upper boundary or a lower boundary of the evaluation region up to a maximum first distance.

10. The device as recited in claim 9, further comprising:
   a sprayer including at least one selectively activatable spray nozzle configured to treat plants or plant components of the second plant type.

11. A non-transitory data medium on which is stored a computer program for classifying plants, the computer program, when executed by a computer, causing the computer to perform the following steps:
   detecting the plants or plant components of the plants within an evaluation region at a first evaluation point in time using an optical and/or infrared detection unit that includes multiple optical and/or infrared recorders;
   evaluating detected image data of the infrared detection unit using an algorithm;
   distinguishing, using the evaluation, at least one first plant type from at least one second plant type; and
   treating the second plant type with a medium;
   wherein certain of the plants or their plant components are assigned to the first plant type at the first evaluation point in time when, within the evaluation region, they are not associated with a plant row formed by the first plant type and protrude into the evaluation region from an upper boundary or a lower boundary of the evaluation region up to a maximum first distance.

* * * * *